United States Patent
Kim

(10) Patent No.: US 9,838,524 B2
(45) Date of Patent: *Dec. 5, 2017

(54) APPARATUS AND METHOD FOR CONTROLLING OPERATION OF MOBILE TERMINAL

(71) Applicant: Samsung Electronics Co., Ltd., Gyeonggi-do (KR)

(72) Inventor: Su Mi Kim, Seoul (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/235,593

(22) Filed: Aug. 12, 2016

(65) Prior Publication Data
US 2016/0352885 A1 Dec. 1, 2016

Related U.S. Application Data

(63) Continuation of application No. 13/302,161, filed on Nov. 22, 2011, now Pat. No. 9,521,232.

(30) Foreign Application Priority Data

Nov. 23, 2010 (KR) .................. 10-2010-0116629

(51) Int. Cl.
*G09G 1/00* (2006.01)
*H04M 1/67* (2006.01)
(Continued)

(52) U.S. Cl.
CPC ............ *H04M 1/67* (2013.01); *H04M 1/673* (2013.01); *H04M 1/7258* (2013.01); *H04M 1/72583* (2013.01); *H04M 2250/22* (2013.01)

(58) Field of Classification Search
CPC ........ G06F 1/00; G06F 3/0481; G06F 3/0484; G06F 3/0482; G06F 3/0488; G06F 3/04817; G09G 1/00
See application file for complete search history.

(56) References Cited

U.S. PATENT DOCUMENTS

2008/0220752 A1 9/2008 Forstall et al.
2010/0146384 A1* 6/2010 Peev .................. H04M 1/673
715/255

(Continued)

FOREIGN PATENT DOCUMENTS

KR 10-0670447 B1 1/2007
KR 10-2009-0046960 A 5/2009
(Continued)

OTHER PUBLICATIONS

European Search Report dated Oct. 6, 2016.
(Continued)

*Primary Examiner* — Michael Faragalla
(74) *Attorney, Agent, or Firm* — Cha & Reiter, LLC

(57) ABSTRACT

A method and an apparatus for controlling an operation of a mobile terminal are preferably includes: cancelling a touch screen off mode and checking a set mode mapped to a certain key when input of the certain key is sensed while the mobile terminal is in the touch screen off mode. A screen is then displayed for executing the set mode, and displaying and processing of a signal input through a touch screen is performed. The method and apparatus provide an advantage by reducing procedures required by conventional devices in which a user process to execute a desired mode in a mobile terminal when the mobile terminal is in a touch screen off mode. By registering a function to be executed by input of one touch button key while in a touch screen off mode
(Continued)

according to user tastes, the present invention accelerates utilization of the mobile terminal.

17 Claims, 7 Drawing Sheets

(51) Int. Cl.
  *H04M 1/725* (2006.01)
  *H04M 1/673* (2006.01)

(56) References Cited

U.S. PATENT DOCUMENTS

| | | |
|---|---|---|
| 2010/0197342 A1 | 8/2010 | Lee |
| 2012/0060123 A1 | 3/2012 | Smith |
| 2017/0255359 A1 | 9/2017 | Lemay et al. |

FOREIGN PATENT DOCUMENTS

| | | |
|---|---|---|
| KR | 10-2010-0088263 A | 8/2010 |
| WO | 2009/076974 A1 | 6/2009 |

OTHER PUBLICATIONS

Apple; "iPhone User Guide (for iOS 31 Software);" Sep. 2009; Rtrvd from internet: http://manuals.info.apple.com/en_US/iPhone_iOS3.1_User_Guide.pdf [Rtrvd on Aug. 8, 2011]; XP55004252.
Korean Search Report, dated Sep. 22, 2016.
Korean Search Report, Dated: Sep. 12, 2017.

\* cited by examiner

APPARATUS AND METHOD FOR CONTROLLING OPERATION OF MOBILE TERMINAL

CROSS REFERENCE TO RELATED APPLICATIONS

This application is a Continuation of U.S. patent application Ser. No. 13/302,161 filed on Nov. 22, 2011 which claims priority under 35 U.S.C. §119 from Korean Patent Application KPA No.: 10-2010-0116629 filed Nov. 23, 2010, the contents of which are incorporated by reference herein in its entirety.

BACKGROUND

Field of the Invention

The present invention relates to a method and an apparatus for controlling an operation of a mobile terminal with a touch screen. More particularly, the present invention relates to a method for executing a mode set when a certain key is input in a touch screen off mode.

Description of the Related Art

Nowadays, mobile terminal has been developed into a multimedia device that provides various functions such as a memo function, a phone function, a game function, a schedule management function, a music and moving image playing function, and a web browser function. In addition, more recent mobile terminals typically include a touch screen that allows a user to use the foregoing functions conveniently and easily upon using an input means such as a key board and a mouse.

In general, when a mobile terminal is not used for a long (typically for at least a preset period) time due to setting of a user or the user directly inputs, a touch screen of the mobile terminal is locked for security by turning off power to the touch screen. Even in a power off state of the touch screen, the mobile terminal may perform various complicated procedures to execute a specific function.

In other words, after the mobile terminal turns-on power of the touch screen and cancels security lock, the terminal should execute a specific function through navigation according to user input. Accordingly, there is a significant delay to execute the specific function of a mobile terminal when the display is in a touch screen off mode. Furthermore, this delay deteriorates convenience for a user and utilization efficiency of the mobile terminal.

SUMMARY

The present invention provides a method that allows a user to rapidly execute a desired function when the mobile terminal is in a touch screen off mode, and an apparatus thereof.

A method and an apparatus for controlling an operation of a mobile terminal according to the present invention provides an advantage in that there is a reduced amount of procedures whereby a user processes in order to execute a desired mode in a mobile terminal when the mobile terminal has entered into a touch screen off mode. Since a method and an apparatus for controlling an operation of a mobile terminal according to the present invention may register a function to be executed by input of one touch button key in a touch screen off mode according to user tastes, the present invention accelerates utilization of the mobile terminal faster than known heretofore.

BRIEF DESCRIPTION OF THE DRAWINGS

The above features and advantages of the present invention will become more apparent to a person of ordinary skill in the art from the following detailed description in conjunction with the accompanying drawings, in which.

DETAILED DESCRIPTION

As used herein, the term "touch screen off mode" means a mode in which power is not supplied to a touch screen of an operable mobile terminal and the touch screen is a security lock state. Further, as used herein, the term "lock cancellation mode" is a mode that security lock is cancelled in a mobile terminal. That is, the lock cancellation mode means a mode that a main menu is displayed on the mobile terminal and functions included in the mobile terminal are executed according to user input through the main menu.

The present invention provides a method and an apparatus for executing a mode set when a one touch input of a certain key is received in a touch screen off mode as a method and an apparatus for controlling an operation of a mobile terminal.

For example, the mobile terminal according to an exemplary embodiment of the present invention executes a registration mode for setting a mode to be executed upon input of a certain key in a touch screen off mode to register information mapping a set mode to the certain key in the mobile terminal. After registering the mapping information, an operation of a mobile terminal in the touch screen off mode may be controlled as follows according to an embodiment of the present invention. When the certain key is input, the mobile terminal cancels the touch screen off mode according to registered mapping information and enters into a set mode. Next, after the mobile terminal executes a set mode a screen is displayed a screen for executing the set mode on a touch screen.

Accordingly, a user may utilize the set mode displayed on the mobile terminal through the touch screen. As illustrated previously, the present invention provides convenience that a user easily accesses and uses a desired function by only entering a one touch input of a certain key in a touch screen off mode, rather than having to first end the touch screen off mode and wait for the mobile terminal to return to full operation screen status before permitting a user to enter a function for execution. Hereinafter, a method and an apparatus for controlling a mobile terminal according to an exemplary embodiment of the present invention will be described in detail.

Figure 1:
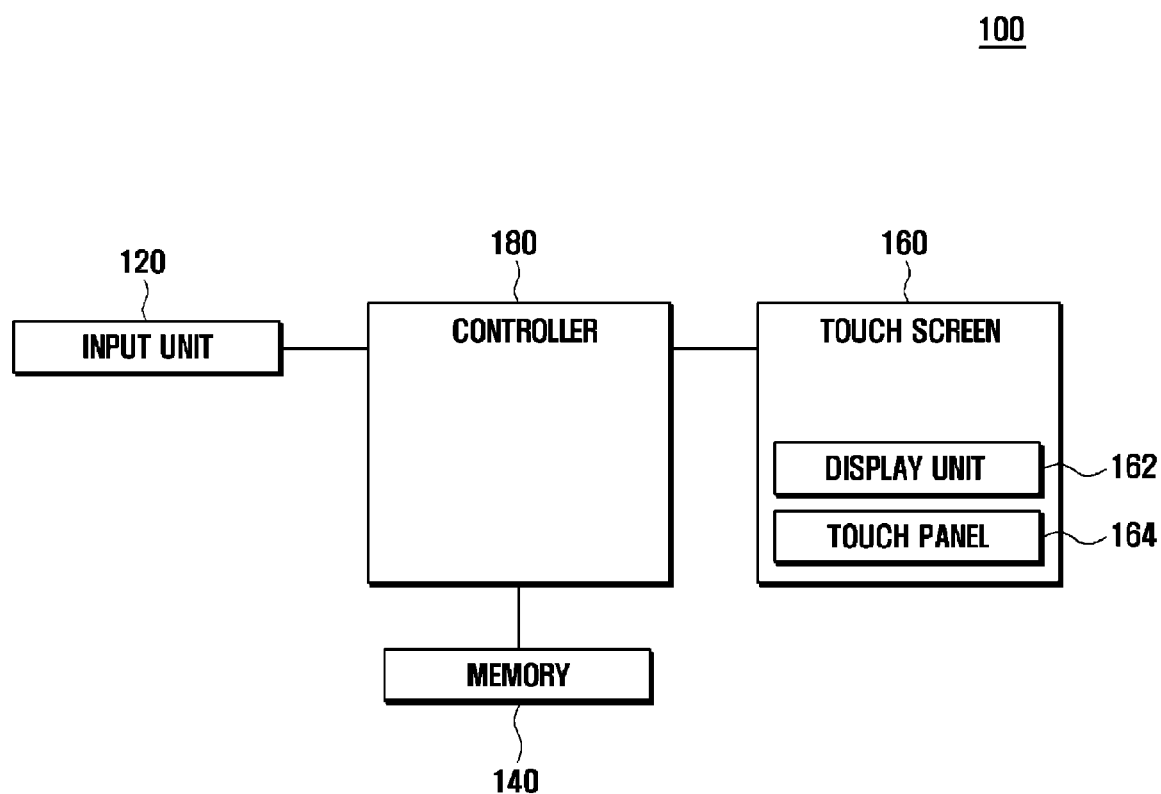
FIG. 1 is a block diagram illustrating a configuration of a mobile terminal according to an exemplary embodiment of the present invention.

FIG. 1 is a block diagram illustrating a configuration of a mobile terminal 100 according to an exemplary embodiment of the present invention.

Referring now to FIG. 1, a mobile terminal 100 preferably includes an input unit 120, a memory 140, a touch screen 160, and a controller 180.

The mobile terminal 100 is representative of and applicable to all kinds of information and communication devices and multi-media devices such as mobile phones, wired/wireless phones, Personal Digital Assistant (PDA), smart phones, DMB terminals, tablet PCs, Global System for Mobile communication (GSM) terminals/General Packet Radio System (GPRS) terminals, 3G terminals, for example, Wideband Code Division Multiple Access (WCDMA) terminals, International Mobile Telecommunication 2000 (IMT-2000) terminals, Code Division Multiple Access (CDMA) terminals, Universal Mobile Telecommunication Service (UMTS) terminals using Wideband Code Division Multiple Access (WCDMA) technology, and applications thereof, just to name a few of the many possible devices that benefit from this invention. In particular, the mobile terminal 100 of the present invention includes a touch screen 160 and an input unit 120.

With continued reference to FIG. 1, the input unit 120 generates an input signal according to an action of a user, for example, a one touch input that is separate from the touch screen 160. Further, the input unit 120 transfers signals input associated with setting of various functions and function controls of the mobile terminal 100 to the controller 180. The input unit 120 is preferably configured by button keys mounted on an external surface of the mobile terminal 100 as well as by the touch screen 160. There are a number of keys including: a hold key 125 of FIG. 5 generating an input signal by one touch, a home screen conversion key (not shown), a volume control key (not shown), a power on/off key (not shown), and a menu key (not shown) as examples of the button keys. The button keys of the input unit 120 according to an exemplary embodiment of the present invention may be used to register mapping information.

The memory 140 includes a program memory and a data memory. The program memory may store an operation program, application programs and programs for various functions driven by an input through the touch screen 160. The programs may include a program for a memo function, a phone function, a game function, a schedule management function, music and moving image playing functions or a web browsing function. In particular, the program memory stores a program for controlling an operation of a mobile terminal 100 according to an exemplary embodiment of the present invention. The data memory stores data used or created while the foregoing programs are executed. In particular, the memory 140 according to an exemplary embodiment of the present invention may further store mapping information. The mapping information is information mapping a mode selected by a user to a selected button key.

With continued reference to FIG. 1, the touch screen 160 includes a display unit 162 and a touch panel 164. The display unit 162 displays a state of the mobile terminal 100, various types of display data and an operation state created from the mobile terminal 100, and characters input from a user. The touch panel 164 is preferably mounted at or along one surface of the display unit 162. If a touch occurs through the touch panel 164, the touch panel 164 senses the touch and detects a coordinate value of the occurrence area of the touch. The touch panel 164 may sense the touch by a resistive type sensing pressure applied to a surface to recognize a contact point, a capacitive type sensing lost charge to recognize a contact point, or an infrared type sensing infrared cut-off to recognize a contact point. After sensing the touch, the touch panel 164 generates a touch sensing signal indicating that the touch occurs and a coordinate value of the occurrence area of the touch. A person of ordinary skill in the art should understand and appreciate that a plurality of types of touch screens in various devices can benefit from the presently claimed invention.

The controller 180 executes a function controlling an overall operation of the mobile terminal 100. In particular, the controller 180, typically a processor or microprocessor, according to an exemplary embodiment of the present invention generates and stores mapping routines automatically executing a mode set upon input of a certain key in a touch screen off mode in a registration mode in the memory 140. The controller 180 determines presence of mode entry set according to mapping information upon receiving a key input while in the touch screen off mode and executes a set mode in conjunction with the touch screen 160. The controller 180 performs an operation according to a signal input through the touch screen 160 when in the set mode. The controller 180 may return the state of the touch screen from the set mode to the touch screen off mode, or may enter the touch screen into a touch lock cancellation mode.

Figure 2:
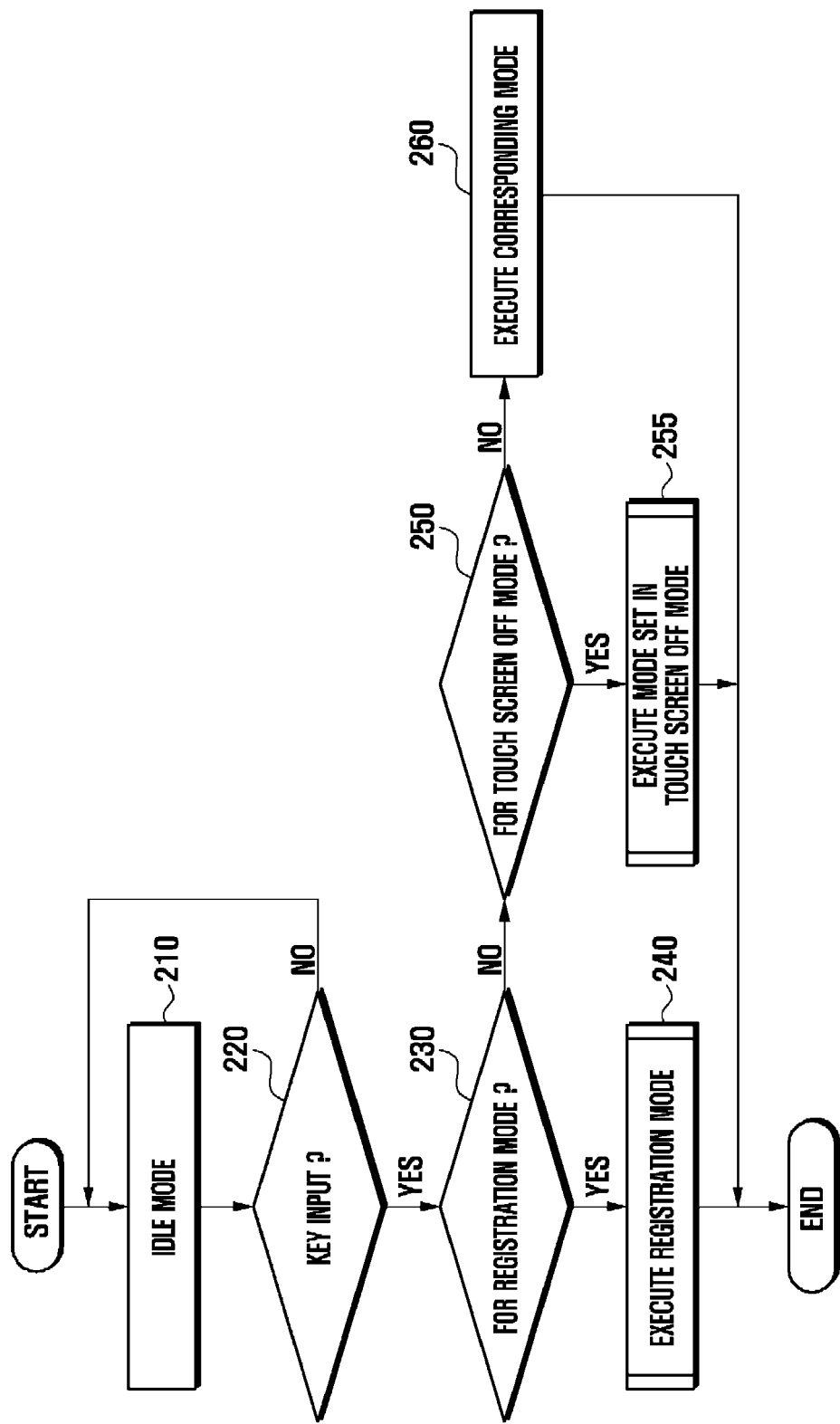
FIG. 2 is a flowchart illustrating exemplary operation for controlling an operation of a mobile terminal according to an exemplary embodiment of the present invention.

FIG. 2 is a flowchart illustrating an operational example of a method for controlling an operation of a mobile terminal 100 according to an exemplary embodiment of the present invention.

Referring now to FIG. 2, in a method for controlling an operation of the mobile terminal 100 according to an exemplary embodiment of the present invention, a controller 180 firstly executes or places the touch screen and/or device into an idle mode (210). When the controller 180 receives button key input of an input unit 120 or soft key input of a touch screen 160, it senses the key input (220), and the process proceeds to step 230. On the other hand, if there is no key input, the controller 180 maintains the idle mode at step 210 until a key input is sensed.

At step 230, the controller 180 determines whether the type of mode associated with the key input received. For example, the controller may first determine whether the key input received in (220) is input for executing a registration mode. When the key input received is input for executing a registration mode at step 230, the controller 180 then at (240) executes the registration mode according to an embodiment of the present invention. A detailed procedure of step 240 will be described with reference to FIG. 3 below.

On the other hand, if the key input received is not the input for executing a registration mode at step 230, the controller 180 preferably determines whether the received key input is input for executing a touch screen off mode (250). If the received key input is not input for executing a touch screen off mode, the controller 180 then preferably executes a corresponding mode of the received key input (260). On the other hand, if at (250) the received key input is input for executing the touch screen off mode, the controller 180 then executes a mode set in the touch screen off mode (255). A detailed procedure of step 255 will be described with reference to FIG. 4, FIG. 5A to FIG. 5C below.

The foregoing exemplary embodiment discloses a mobile terminal 100 for determining whether received key input is input for executing a touch screen off mode after determining whether the received key input is input for executing a registration mode in an idle mode. However, a determining order of an execution mode of the received key input can be varied.

The execute registration mode mentioned previously regarding step (240) will now be explained in further detail with reference to FIG. 3.

Figure 3:
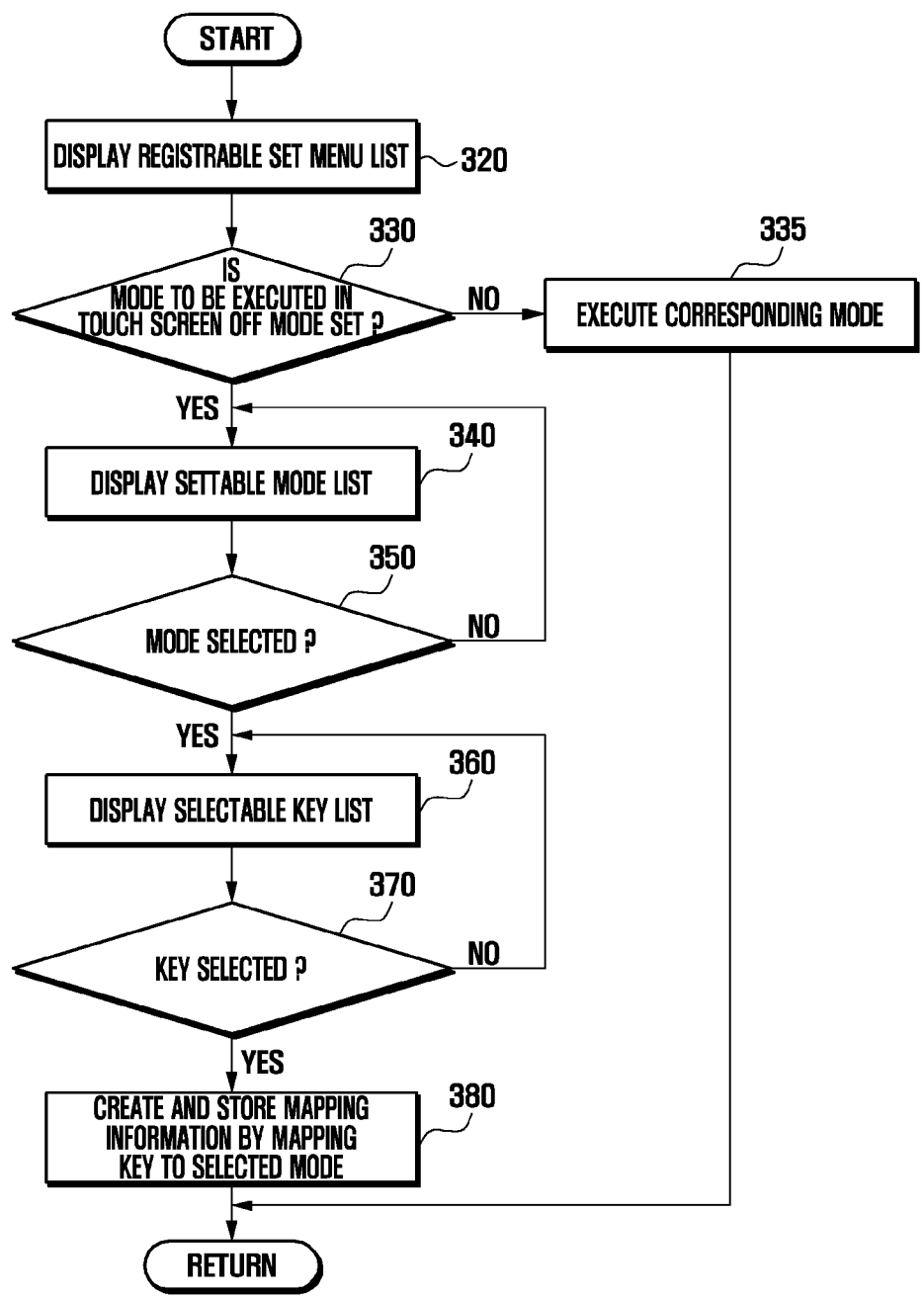
FIG. 3 is a flowchart illustrating step 240 how registering a mode is executed in a touch screen off mode of FIG. 2.

FIG. 3 is a flowchart illustrating step 240 registering a mode is executed in a touch screen off mode of FIG. 2.

Referring to FIG. 3, at (320) a controller 180 (such as in FIG. 1) displays a registrable set menu list on display such as a touch screen 160. At this time, the controller 180 may control set menu items associated with an environment setting of the mobile terminal 100 to be displayed on the list.

Next, at (330) the controller 180 determines whether to set mode to be executed while in the touch screen off mode. At this time, if anyone is selected from set menus through the touch screen 160 while displaying the set menu list, the controller 180 determines whether a selected set menu is for registering a mode to be executed in the touch screen off mode. Accordingly, if the selected set menu is for registering a mode to be executed in the touch screen off mode, the controller 180 proceeds to perform step 340 and control display of the settable mode list. On the other hand, if the selected set menu is not a menu for registering a mode to be executed in the touch screen off mode, the controller 180 executes a registration mode corresponding to the selected set menu (335), and then the process returns to FIG. 2.

At step (340) the controller 180 displays a settable mode list on the touch screen. At this time, the controller 180 may display a certain mode requesting input through the touch screen 160. For example, there may be a phone dial mode displaying a numeral keypad, a music playing mode displaying a music file list, a call mode displaying a recent call list, and a web browsing mode displaying a web browser as an example of a mode included in the settable mode list. Accordingly, the present invention is advantageous in that it allows a user to switch a mode executed in the touch screen off mode to a desired mode.

If at (350) any one is selected from a mode list displayed on the touch screen 160 by a user, the controller 180 proceeds to step 360.

At (360) the controller 180 displays a selectable key list on the touch screen 160. At this time, the controller 180 displays button keys of an input unit 120 for executing a selected mode executed in the touch screen off mode as illustrate earlier. Subsequently, if at (370) a key is selected, the controller 180 at (380) maps a selected mode to the selected key to create and store mapping information in a memory 140. The foregoing embodiment has illustrated a procedure that firstly sets a mode executed in the touch screen off mode and then set a key executing the mode. However, a setting order of the mode and the key may be exchanged. The controller 189 performs step 380 and returns to FIG. 2. Step 255 illustrated previously will be explained in detail with reference to FIG. 4.

Figure 4:
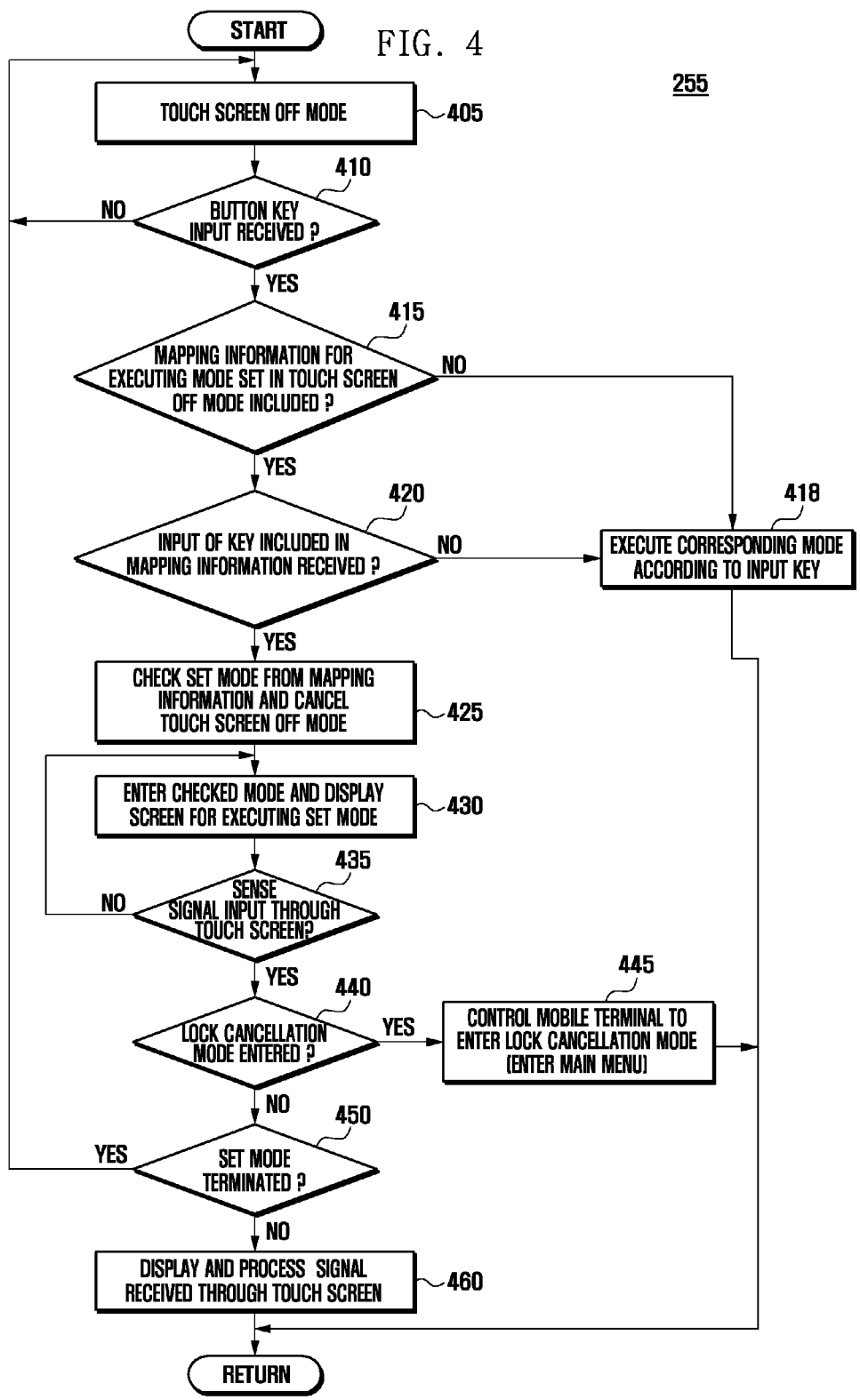
FIG. 4 is a flowchart illustrating step 255 executing a mode set in a touch screen off mode of FIG. 2.
Figure 5A:
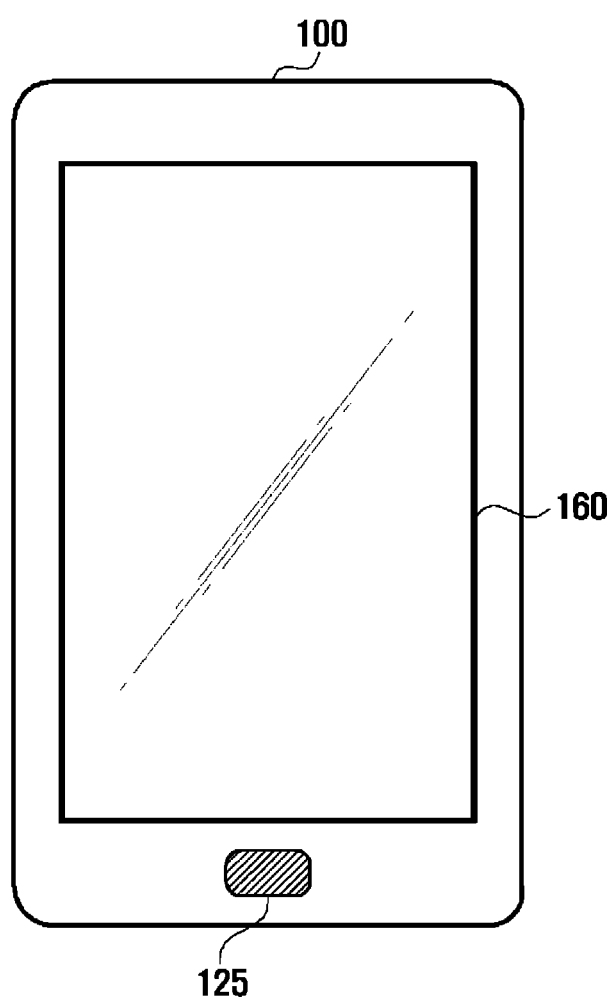
FIG. 5A is a schematic view illustrating a mobile terminal in a touch screen off mode.
Figure 5B:
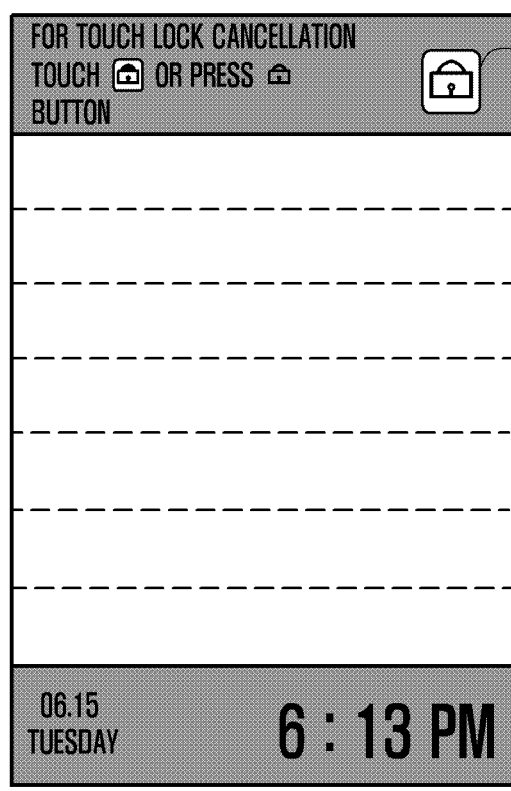
FIG. 5B is a view illustrating a screen for executing a memo making mode according to an embodiment of the present invention.
Figure 5C:
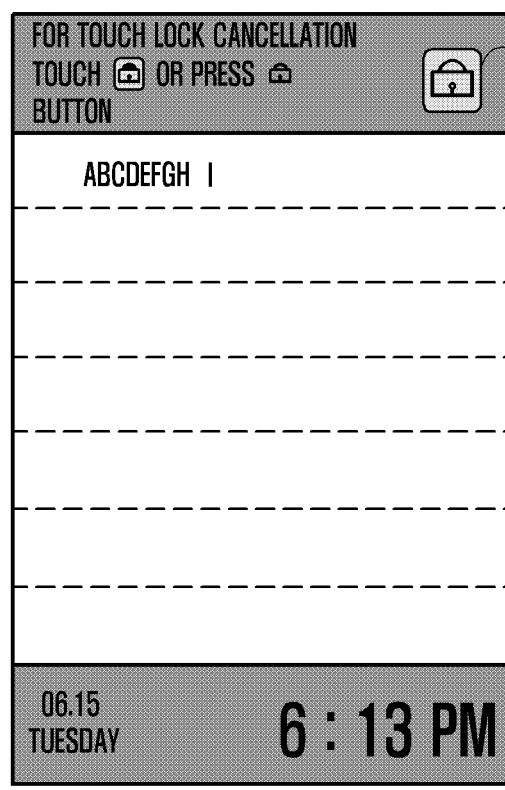
FIG. 5C is a view illustrating a screen displaying a signal input in a memo making mode through a touch screen according to an embodiment of the present invention.

FIG. 4 is a flowchart illustrating details of step 255 executing a mode set in a touch screen off mode of FIG. 2. FIG. 5A is a schematic view illustrating a mobile terminal in a touch screen off mode. FIG. 5B is a view illustrating a screen for executing a memo making mode according to an exemplary embodiment of the present invention. FIG. 5C is a view illustrating a screen displaying a signal input in a memo making mode through a touch screen according to an embodiment of the present invention.

A method executing a mode set upon input of a certain key in a touch screen off mode according to an embodiment of the present invention will be described with reference to FIG. 4, FIG. 5A to FIG. 5C.

Referring now to FIG. 4, at (405) a controller 180 controls a mobile terminal 100 entry into a touch screen off mode. At this time, the controller 180 may control not to supply power to a touch screen 160, or may dim the illumination of the screen and set the touch screen 160 to be in a security lock state. While the mobile terminal 100 is in the touch screen off mode, at (410) the controller 180 senses button key input from an input unit 120. If the button key input is sensed, the controller 180 accesses a memory 140 and at (415) determines whether mapping information for executing a mode set in the touch screen off mode is included in the memory 140. If the mapping information is not included in the memory 140 at step 415, at (418) the controller 180 executes a corresponding mode according to an input key.

After performing step 418, the process returns to the flowchart shown in FIG. 2. On the other hand, if the mapping information is included in the memory 140 at step 415, then at (420) the controller 180 determines whether input of a key included in the mapping information is received. At this time, the controller 180 determines whether the input of the button key sensed at step 410 is input of a certain key included in mapping information checked at step 415. If the sensed input of the button key is not the input of a certain key, at (418) the controller 180 executes a corresponding function of the received key input.

If the certain key included in the mapping information is input in the touch screen off mode at (420), then at (425) the controller 180 proceeds to check the set mode from mapping information and cancels the touch screen off mode. For example, if input of a hold key 125 shown in FIG. 5A is received, the controller 180 may perform step 425. The controller 180 at step (425) accesses the memory 140 to check a set mode from mapping information stored therein. Further, the controller 180 cancels a touch off mode. Subsequently, the controller 180 at (430) controls the mobile terminal 100 to enter a checked mode, namely, the set mode. Further, the controller 180 displays a screen for executing the set mode on a touch screen 160. Moreover, the controller 180 may control further display of information regarding a lock cancellation mode on the screen for executing the set mode. For example, the information regarding the lock cancellation mode may become a lock cancellation soft key 1641, lock cancellation method description, date, and time.

For example, when the set mode is a memo making mode, the controller 180 may control a screen as shown in FIG. 5B to be displayed on the touch screen 160. Accordingly, the present invention provides an advantage in that it reduces procedures performed by the mobile terminal 100 to execute a mode requested from the user in the touch screen off mode. Accordingly, the present invention allows a user to rapidly use a desired mode by only a one touch input of a certain key 120 included in mapping information when the device is in a touch screen off mode.

After the screen for executing the set mode is displayed, at (435) the controller 180 senses a signal input through the touch screen 160. In an exemplary embodiment of the present invention, when the input through the touch screen has not been received for a predetermined time, the controller 180 may control the mobile terminal to return to the touch screen off mode. After sensing the input through the touch screen 160, the controller 180 at (440) determines whether the mobile terminal 100 enters a lock cancellation mode. In this case, the controller 180 may determines whether the mobile terminal 100 enters the lock cancellation mode according to presence of input of a lock cancellation soft key 1641 displayed on a screen. If the mobile terminal 100 enters the lock cancellation mode, the controller 180 at (445) finishes the set mode and controls the mobile terminal 100 to enter the lock cancellation mode. At this time, the controller 180 may control a main menu to be displayed on the touch screen 160 according to the lock cancellation mode. As illustrated previously, after the mobile terminal 100 enters the lock cancellation mode, it returns to FIG. 2. When the mobile terminal 100 does not enter the lock cancellation mode, the controller 180 performs step 450.

With continued reference to FIG. 4, at (450) the controller 180 determines whether the set mode is terminated. At this time, the controller 180 may determine whether a signal input through the touch screen 160 is a termination request signal of the set mode. If the termination request signal of the set mode is received, the controller 180 returns to perform step (405). After termination of the set mode, the mobile terminal 100 again enters the touch screen off mode. For example, a memo making mode may be set to be terminated after storing a memo. Accordingly, if a termination command of the memo making mode, namely, a memory storing command is received through the touch screen 160, the controller 180 may control power of the touch screen 160 not to be supplied after storing the memo and to be in a lock state. If the termination request signal of the set mode is not received, the controller 180 performs a next step.

At (460), the controller 180 displays and processes a signal received through the touch screen 160. For example, in a case where the set mode is the memo making mode, if a touch or a gesture set in the memo making mode is received through the touch screen 160, the controller 180 may display and process information input according to the memo making mode. For example, if input through the touch screen 160 occurs in a memo book (as shown in FIG. 5B), the controller 180 may display a keyboard (not shown) or execute character recognition according to the memo making mode. If a character is input through the displayed keyboard or the character recognition, the controller 180 may control display of a screen as shown in FIG. 5C, or possibly display a template for a memo. Further, if flick input occurs in the memo book, the controller 180 may implement a motion moving the memo book to a flick input direction (i.e. screen flick by touch) according to the memo making mode. If a memo storing soft key (not shown) is input, the controller 180 may store information input to the memo book in the memory 140 according to the memo making mode. The controller 180 performs step 460 as illustrated previously and returns to FIG. 2.

The above-described methods according to the present invention can be realized in hardware, firmware or as software or computer code that can be stored in a non-transitory recording medium such as a CD ROM, a RAM, thumbnail drive, a floppy disk, a flash storage, a hard disk, or a magneto-optical disk, etc., or downloaded over a network and stored in storage, so that the methods described herein can be executed by such software using a general purpose computer, special computer, microprocessor, special processor, or in a programmable or dedicated hardware, such as an ASIC or FPGA. As would be understood in the art, the computer, the processor or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein.

What is claimed is:

1. A method for controlling an operation of a mobile terminal having a display screen, the method comprising:
   determining by a controller an application mapped to a physical key of the mobile terminal when an input to the physical key is sensed, wherein the application is a program that produces new information based on user input;
   in response to the sensed input of the physical key while the display screen is in a security lock state, executing the application mapped to the physical key, which comprises displaying an executing screen of the application;
   displaying an icon with the executing screen of the application; and
   displaying a screen in the security lock state instead of the application executing screen upon touch selection of the icon.

2. The method of claim 1, further comprising registering by the controller the application to be executed mapped to the physical key, responsive to a user input selection.

3. The method of claim 2, wherein the registering comprises setting a memo making application as the application mapped to the physical key, and the user data input comprises text data of the memo making application.

4. The method of claim 3, wherein the physical key comprises a button key of the mobile terminal.

5. The method of claim 1, wherein the screen for executing the application includes the icon.

6. The method of claim 1, wherein the controller, after controlling the display screen to display the screen for executing the application, turns off the display screen when a signal input through the display screen is a termination request signal of the application.

7. A mobile terminal comprising:
   a display screen;
   a physical key for executing an application, wherein the application is a program that produces new information based on user input;
   a memory storing information regarding the physical key and mapping information of the application for the physical key; and
   a controller configured to control operations comprising:
   in response to sensing an actuation of the physical key while the display screen is in a security lock state;
   executing the application mapped to the physical key, which comprises displaying an executing screen of the application;
   displaying an icon with the execution screen of the application; and
   displaying a screen in the security lock state instead of the application executing screen upon touch selection of the icon.

8. The mobile terminal of claim 7, wherein the controller creates and stores the mapping information in the memory according to user input during a registration mode.

9. The mobile terminal of claim 8, wherein the application mapped to the physical key is a memo making application, and the user input data comprises text data of the memo making application.

10. The mobile terminal of claim 7, wherein the screen for executing the application includes the icon.

11. The mobile terminal of claim 7, wherein the controller turns off the display screen when a signal input through the display screen is a termination request signal of the application.

12. The mobile terminal according to claim 7, wherein the physical key for executing the mapped application is preset by the mobile terminal.

13. The mobile terminal according to claim 7, wherein the physical key for the mapped application is user-reprogrammable.

14. The method of claim 1, wherein a majority portion of the screen includes an executed image for the application.

15. The mobile terminal of claim 7, wherein a majority portion of the screen includes an executed image for the application.

16. A method for controlling an operation of a mobile terminal having a display screen, the method comprising:
determining by a controller an application mapped to a physical key of the mobile terminal when an input to the physical key is sensed while the display screen is turned off, wherein the application is a program that produces new information based on user input;
in response to the sensed input, executing the application mapped to the physical key, which comprises displaying an executing screen of the application, wherein the executing screen is a screen for receiving the user input, displaying an image corresponding to the user input and storing the image;
displaying an icon for displaying a main menu screen; and
displaying the main menu screen instead of the application executing screen upon touch selection of the icon.

17. A mobile terminal comprising:
a display screen;
a physical key for executing an application, wherein the application is a program that produces new information based on user input;
a memory storing information regarding the physical key and mapping information of the application for the physical key; and
a controller configured to control operations of:
turning on the display screen when actuation of the physical key is sensed while the display screen is turned off;
in response to the sensed actuation, executing the application mapped to the physical key, which comprises displaying an executing screen of the application;
displaying an icon for displaying a main menu screen; and
displaying the main menu screen instead of the application executing screen upon touch selection of the icon;
wherein the executing screen is a screen for receiving user input, displaying an image corresponding to the user input and storing the image.

* * * * *